United States Patent [19]

Matsumura et al.

[11] Patent Number: 5,581,360
[45] Date of Patent: Dec. 3, 1996

[54] METHODS AND SYSTEMS FOR DUBBING A VARIABLE-LENGTH ENCODED DIGITAL VIDEO SIGNAL ON A RECORD MEDIUM

[75] Inventors: Osamu Matsumura, Chiba; Keiji Kanota, Kanagawa; Hajime Inoue, Chiba; Naofumi Yanagihara, Tokyo, all of Japan

[73] Assignee: Sony Corporation, Tokyo, Japan

[21] Appl. No.: 76,976

[22] Filed: Jun. 16, 1993

[51] Int. Cl.⁶ ........................................... H04N 5/76
[52] U.S. Cl. ..................... 386/46; 360/15; 386/52
[58] Field of Search ..................... 358/335, 310, 358/319, 337, 336, 426, 311; 348/403, 384, 397; 360/13, 15, 32; H04N 5/76, 5/92

[56] References Cited

U.S. PATENT DOCUMENTS

| | | | |
|---|---|---|---|
| 4,775,897 | 10/1988 | Umemoto et al. | |
| 4,791,495 | 12/1988 | Umemoto et al. | |
| 5,023,710 | 6/1991 | Kondo et al. | 358/335 |
| 5,027,232 | 6/1991 | Sekii et al. | 360/15 |
| 5,060,077 | 10/1991 | Koya et al. | 358/312 |
| 5,148,272 | 9/1992 | Acampora et al. | 348/397 |
| 5,175,631 | 12/1992 | Juri et al. | 358/335 |
| 5,193,010 | 3/1993 | Juri et al. | 358/336 |
| 5,216,518 | 6/1993 | Yamagami | 358/426 |
| 5,289,190 | 2/1994 | Shimoda et al. | 348/384 |
| 5,291,282 | 3/1994 | Nakagawa et al. | 348/384 |

FOREIGN PATENT DOCUMENTS

| | | |
|---|---|---|
| 0353757 | 2/1990 | European Pat. Off. |
| 0415699 | 3/1991 | European Pat. Off. |

OTHER PUBLICATIONS

IEEE Proceedings F. Communications, Radar & Signal Processing vol. 135, no. 6, Dec. 1988, Stevenage GB pp. 528–538 XP35755 'Effect of channel errors on source coded image data and the provision of adequate protection of transmission bits'.

IEEE Transactions on Consumer Electronics vol. 37, No. 3, Aug. 1991, New York US pp. 275–282 XP263196 Yoneda et al. 'An experimental digital VCR with new DCT–based bit–rate reduction system'.

*Primary Examiner*—Thai Q. Tran
*Assistant Examiner*—Huy Nguyen
*Attorney, Agent, or Firm*—William S. Frommer; Alvin Sinderbrand

[57] ABSTRACT

Methods and systems are provided for dubbing a digital video signal on a record medium wherein the digital video signal includes variable-length codes arranged in a fixed-length word format. The variable-length codes are separated from the fixed-length word format data. Error codes indicating errors in the separated variable-length codes are provided. The separated variable-length codes together with the error codes are formed into new data blocks having a fixed-length word format and the new data blocks are recorded on a record medium.

22 Claims, 11 Drawing Sheets

FIG. 7A  TWO-DIMENSIONAL VARIABLE-LENGTH CODE TABLE

| ENTRY | LENGTH | CODEWORD | |
|---|---|---|---|
| (0,1) | 2+1 | (LSB) 10S (MSB) | |
| (0,2) | 3+1 | 110S | |
| (1,1) | 4+1 | 1110S | |
| (0,3) | 4+1 | 0011S | |
| (0,4) | 4+1 | 0010S | |
| (0,5) | 4+1 | 0110S | |
| EOB | 5+1 | 11110R | SYNC |
| (2,1) | 5+1 | 01011S | |
| (0,6) | 5+1 | 01001S | |
| (1,2) | 5+1 | 01010S | |
| (3,1) | 5+1 | 01110S | |
| (0,7) | 6+1 | 111110S | SYNC |
| (4,1) | 6+1 | 011110S | SYNC |
| ⋮ | ⋮ | ⋮ | |

* (A,B)=("0" RUNLENGTH, NON "0" COEFFICIENT)
* SYNC = SYNCHRONIZING WORD
* S = SIGN BIT
* R = SPECIAL BIT

ERROR CODE : 01111111 OR 10000000

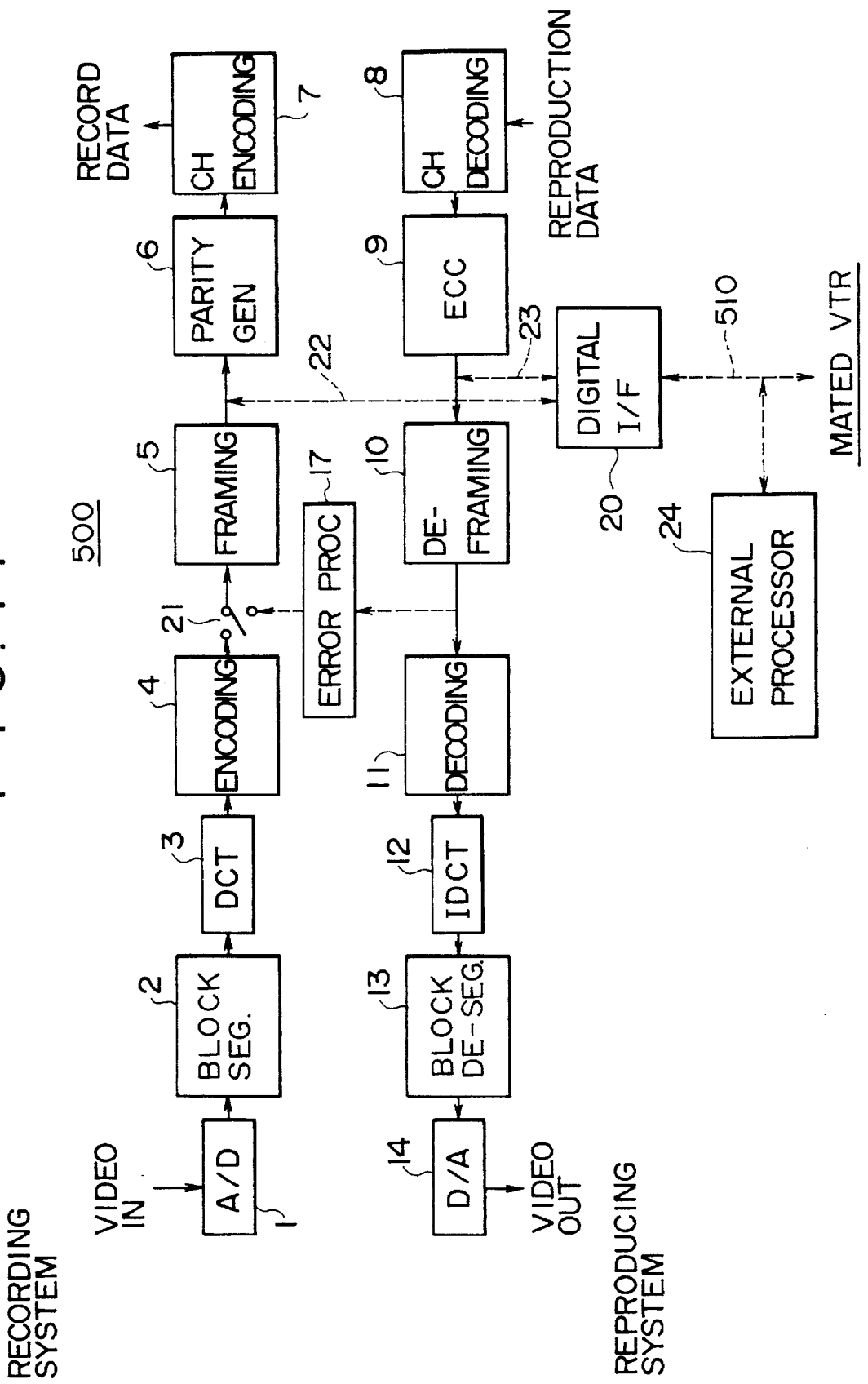

METHODS AND SYSTEMS FOR DUBBING A VARIABLE-LENGTH ENCODED DIGITAL VIDEO SIGNAL ON A RECORD MEDIUM

BACKGROUND OF THE INVENTION

The present invention relates to methods and systems for dubbing a data-compressed digital video signal on a record medium with the use of a digital video tape recorder (VTR), video disk recorder or the like.

Digital VTR's have been developed for broadcasting applications utilizing D1, D2 and D3 formats. In addition, various other formats have been proposed for consumer-use VTR's.

FIG. 1 provides a block diagram of a consumer-use digital VTR which carries out data compression through discrete cosine transformation (DCT) and variable length coding of data to be recorded. As shown in FIG. 1, an input analog component video signal (Y, R-Y, B-Y) is converted to a digital component video signal by means of A-D converter 1 and is then formed into data blocks by a block segmentation circuit 2 employing a frame memory. Each block of data is arranged as eight horizontal samples by eight vertical lines of a corresponding picture and is also referred to hereinafter as an 8×8 unit. The resultant data is shuffled and Y/C-multiplexed. Each of the 8×8 units is then discrete cosine transformed by a DCT circuit 3 to convert the data therein from the time domain into the frequency domain, so that each DCT converted block includes a DC component and one or more AC components. The discrete-cosine-transformed data is then re-quantized by an encoder 4 and variable-length encoded therein for data compression by a technique such as two-dimensional Huffman coding.

In the above-described system, the step width used in the re-quantization process is selected separately for each successive group of thirty DCT blocks, each such group also being referred to herein as a buffering unit, so that when the data is re-quantized the amount thereof will not exceed a certain level. Referring also to FIG. 2, each buffering unit is formed into a plurality of sync blocks, each including six blocks of data arranged successively as two luminance blocks Y, followed by a color component block C, followed in turn by a further two luminance blocks Y which then is followed by a final color component block C. It will be seen from FIG. 2 that each group of six blocks is provided with synchronization data (SYNC), identification data (ID) and auxiliary data (AUX), as well as quantization step size data (QNO) and parity data. Moreover, the data in each sync block is arranged as a sequence of ninety bytes. The data of each DCT block Y and C is further arranged to place the DC component thereof first, followed by a lowest frequency AC component which is followed in succession by further AC components of increasingly higher frequencies. The data of each DCT block is terminated by an end of block (EOB) code. Since the space provided for each of the DCT blocks is limited, any data which exceeds the predetermined limit of a respective block as shown in FIG. 2 (referred to as overflow data) is included in any available empty area of at least one other DCT block.

With reference again to FIG. 1, a framing circuit 5 serves to vertically align a plurality of buffering units as described above into a larger unit which is combined with an error correction code (ECC) by a parity generator 6. The data as thus constituted is then converted by means of a channel encoder 7 into serial form for recording.

When the data in serial form is reproduced, it is detected and converted to parallel form by means of a channel decoder 8 and then error-corrected by an ECC circuit 9. The error-corrected data is then separated into the variable-length code words of each block by a de-framing circuit 10 and subsequently decoded and de-quantized by a decoder 11. The resultant data is then inversely discrete cosine transformed by an inverse DCT circuit (IDCT) 12 to yield 8×8 unit blocks of time domain data.

The data blocks as thus reproduced are de-shuffled, Y/C demultiplexed and data-interpolated by a block desegmentation circuit 13 to recover the digital component video signal. Finally, the digital video signal is converted by a D/A converter 14 into a reproduction of the original analog component video signal to be output by the reproducing system of FIG. 1.

Data processing as carried out in the framing circuit 5 and de-framing circuit 10 of FIG. 1 will now be described in greater detail with reference to FIG. 3. As mentioned above, each DCT block includes a DC data component and one or more AC data components. The DC component of each block has a fixed word length, while the AC components are encoded as variable-length data. As shown at (1) of FIG. 3, the AC data of a representative DCT block includes 15 variable-length words, each AC component being indicated by an asterix [*], which designation is similarly employed throughout the present application to designate AC data. It will be appreciated that the number of variable-length words in the DCT blocks will vary from block to block. As illustrated at (2) of FIG. 3, the DCT blocks as shown at (1) of FIG. 3 are packed into a fixed-length word format by means of the framing circuit 5 of FIG. 1, in this example, as a sequence of 8-bit words, prior to recording.

When the data is reproduced, it is error-corrected by the ECC circuit 9 of FIG. 1. The byte length data supplied by the ECC circuit is illustrated, for example, at (3) of FIG. 3. As shown therein, an error bit is added to each 8 bit word by the ECC circuit 9 for indicating those bytes having erroneous data which cannot be corrected by the circuit 9. Each buffering unit with such error information attached is separated by the de-framing circuit 10 into valid data as well as variable-length code words which include data impossible to decode due to such errors. As indicated at (4) of FIG. 3, if an error should occur in an AC component *10 of the exemplary DCT block as reproduced, each of the higher frequency components *11 through *15 is likewise impossible to decode due the error in component *10. Based on the attached error information, the block de-segmenting circuit 13 carries out interpolation for purposes of error compensation.

To carry out dubbing with the digital VTR described above, three possible techniques, labelled respectively A, B and C as illustrated in FIG. 4, are described hereinafter. Technique A is an ordinary analog dubbing technique in which the analog output of D/A converter 14 is supplied to the input of A/D converter 1 of the recording system. Technique B is a digital dubbing technique in which a digital component output from the block de-segmenting circuit 13 is supplied via a digital interface (I/F) 15 to the input of the block segmentation circuit 2 of the recording system.

Technique C is a digital dubbing technique in which reproduced data subjected to error correction by the ECC circuit 9 and separated into variable-length code words by the de-framing circuit 10, are conveyed via a digital interface (I/F) 16 to the framing circuit 5 of the recording system of FIG. 4. Thereupon the data are rearranged in sync block format by the framing circuit 5, supplied with new parities by the parity generator 6 and then recorded.

The analog dubbing technique A mentioned above necessarily degrades image quality. Since technique B processes an uncompressed video signal, its transfer rate is relatively high (approximately 100 Mbps). Also, since the data is again subjected to DCT, it is possible that image quality degradation can result.

Although technique C provides a relatively low transfer rate because the video signal is compressed, the error information provided by the ECC circuit 9 to designate residual (that is, uncorrectable) errors is lost when the framing circuit 5 converts the data into the fixed-length, sync block format. Consequently, erroneous data will be decoded upon reproduction of data dubbed in this manner. In addition, errors occurring in the transmission path including that from the reproducing system to the recording system (for example, in the digital I/F 16) will be treated as valid data and decoded upon reproduction.

The following measures may be considered for alleviating the foregoing problem:

(1) error compensation by interpolation may be carried out by the digital I/F 16 or the ECC circuit 9; or (2) the data may be transmitted from the reproducing system to the recording system with a parity to be recorded therewith.

However, interpolation requires a frame memory. In addition, since the data to be processed has been variable-length encoded and formed into DCT blocks, all of the data in each DCT block in which an error has occurred must be replaced by interpolation, and only blocks which are error-free may be used for this purpose. Accordingly, otherwise valid data in a DCT block in which an error has occurred will be lost. Where an image is reproduced from a master tape, valid data from blocks containing errors (for example, an AC component having a frequency lower than a component represented by the erroneous data) may still be employed to produce an image. Consequently, a mismatch will occur between an image produced from such a master tape and one reproduced from a tape in this manner.

Transmission of the data with a parity for recording does not prevent accumulation of errors resulting from repeated dubbing operations. Such errors substantially impair the correction capability of the ECC circuit which can lead to image quality degradation.

OBJECTS AND SUMMARY OF THE INVENTION

It is one object of the present invention to provide methods and systems for dubbing a digital video signal on a record medium which alleviate the foregoing problems.

It is another object of the present invention to provide such methods and systems which provide a low data transfer rate.

It is a further object of the present invention to provide such systems and methods which maintain image quality at a high level.

In accordance with the present invention, methods and systems are provided for dubbing a digital video signal on a record medium, the digital video signal being encoded to include a plurality of variable-length codes arranged in first data blocks in a fixed-length word format, comprising the steps of and the means for, respectively, separating the plurality of variable-length codes from the first data blocks to provide separated variable-length codes; providing error codes indicating errors in the separated variable-length codes; including the separated variable-length codes together with the error codes in second data blocks having a fixed-length word format; and recording the second data blocks on the record medium.

In one embodiment of the present invention, after data has been reproduced in the form of variable-length codes arranged as fixed-length words by a reproducing unit, the variable-length codes are separated. Any of the separated data containing an error which cannot be corrected is replaced by a predetermined code. In particular, AC components in which uncorrectable errors have occurred are replaced by an end-of-block (EOB) code defined in a variable-length code table. Advantageously, the EOB codes which replace the erroneous data are distinguished from normal EOB codes, for example, by the state of the last bit thereof.

Digital video signals which have been dubbed in this manner may be error processed on a variable-length code word basis. Since it is unnecessary to carry out interpolation, valid data is not lost due to the complete replacement of DCT blocks in which errors have occurred which would result in degradation of image quality. It will also be appreciated that the present invention permits the transmission of data between reproducing and recording systems for dubbing in compressed form thus enabling an advantageously low data transfer rate. It will also be appreciated that the use of the EOB code to replace AC components having erroneous data as well as the following AC components of the same block will not cause an overflow error.

The above, and other objects, features and advantages of the invention, will be apparent in the following detailed description of certain illustrative embodiments thereof which is to be read in connection with the accompanying drawings forming a part hereof, and wherein corresponding parts and components are identified by the same reference numerals in the several views of the drawings.

BRIEF DESCRIPTION OF THE DRAWINGS

FIG. 7A illustrates a two-dimensional variable-length code table including an end-of-block (EOB) error code used in the embodiment of FIG. 5;

FIG. 11 is a block diagram illustrating a system and method in accordance with a third embodiment of the present invention.

DETAILED DESCRIPTION OF AN ADVANTAGEOUS EMBODIMENT

First Embodiment

Figure 5:
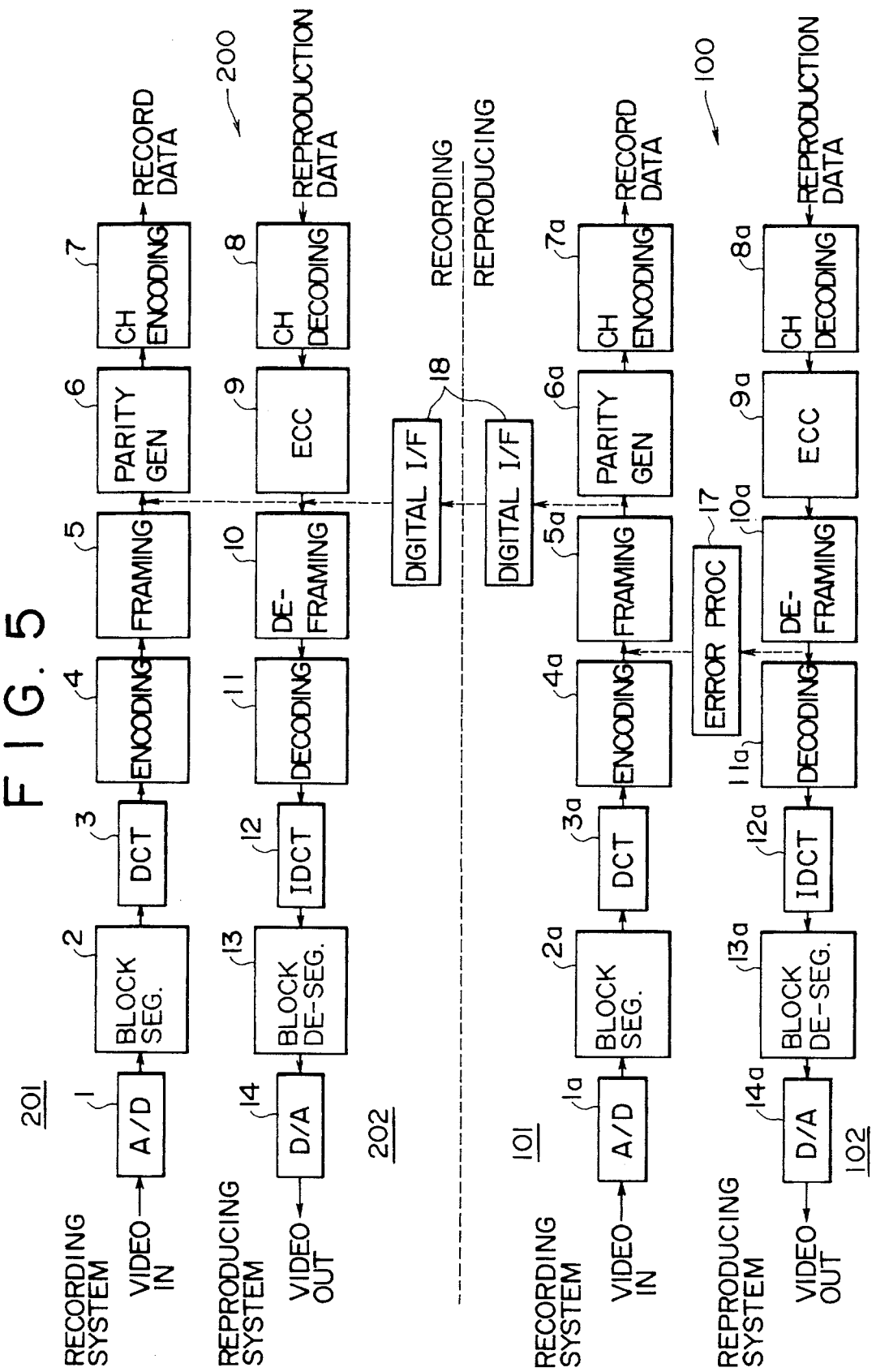
FIG. 5 is a block diagram illustrating a system and method for carrying out dubbing in accordance with a first embodiment of the present invention.

FIG. 5 is a block diagram of a system for dubbing a digital video signal, recording the same on a record medium, the system including a reproducing unit 100 and a recording unit 200. The reproducing unit 100 and recording unit 200 each is provided with a respective recording system 101 and 201 and a respective reproducing system 102 and 202. The recording systems 101 and 201 each include an A/D converter 1a and 1 operative to receive input video signals and convert the same to digital form, providing the digitized video signals to respective block segmentation circuits 2a and 2 where the digital data is converted to 8×8 units or blocks provided at corresponding outputs. The outputs of the block segmentation circuits 2a and 2 are coupled with corresponding inputs of respective discrete cosine transformation (DCT) circuits 3a and 3 for conversion to frequency domain components. The DCT circuit 3a provides the frequency domain components to an encoding circuit 4a, while the DCT circuit 3 provides its frequency domain components to an encoding circuit 4, the circuits 4a and 4 serving to variable-length encode the respective data received thereby which each supplies to a corresponding output coupled with the input of a respective framing circuit 5a and 5. The framing circuits 5a and 5 form the respective received data into sync block format and supply the same to corresponding parity generators 6a and 6 which serve to produce and affix parity data thereto, supplying the sync block data with accompanying parity data to respective channel encoders 7a and 7 for encoding in a format suitable for recording on a record medium.

The reproducing systems 102 and 202 each have a respective channel decoder 8a and 8 for receiving reproduced data from a recording medium for channel decoding, the channel decoders 8a and 8 providing the decoded data to respective error correction circuits (ECC) 9a and 9 for error correction. The ECC circuits 9a and 9 provide their respective error-corrected data to corresponding de-framing circuits 10a and 10 which serve to separate the data into DC components and individual variable-length AC components, providing the thus-separated data to respective inverse discrete cosine transformation (IDCT) circuits 12a and 12 for reconversion to time-amplitude data. The IDCT circuits 12a and 12 supply the transformed data to respective block de-segmentation circuits 13a and 13 to recover the digital component video signals, the same then being reconverted to analog form by respective D/A converters 14a and 14 and provided at respective video outputs of the reproducing systems 102 and 202.

In the reproducing unit 100, the output of the de-framing circuit 10a is supplied to a dubbing error processor (Error Proc) 17 for the addition of error codes thereto, as explained in greater detail hereinbelow. As thus processed, the data is supplied by the dubbing error processor 17 to the input of the framing circuit 5a which re-forms the data in sync blocks having a fixed-length word format and supplies the same to the input of a digital interface (I/F) 18 for output to the recording unit 200, while the circuits 1a through 4a, 6a and 7a of the recording system 101 are maintained in an inoperative state.

The data supplied via the digital interface 18 is received by the parity generator 6 of the recording unit 200 to be recorded with a newly generated parity. The data received from the digital interface 18 is also supplied to the de-framing circuit 10 in order to provide a video output for monitoring the data being recorded pursuant to the dubbing process. During this operation, the circuits 1 through 5 of the recording system 201 as well as the ECC circuit 9 and channel decoding circuit 8 are maintained in an inoperative state. It will be appreciated that, since the data as output by the de-framing circuit 10a has been separated into DC components and variable-length encoded AC components, error processing can then be carried out on a component-by-component (or word-by-word) basis.

The dubbing error processor 17 employs interpolation within a frame or along the time axis, from frame to frame. Accordingly, it is necessary to address the following problems:

(1) Since the data in n×n pixel blocks (for example, 8×8 pixels) has been discrete cosine transformed, interpolation is performed by DCT block units, so that it is difficult to carry out interpolation within a frame by using peripheral pixels outside the DCT block being interpolated;

(2) Interpolation along the time axis requires the use of a frame memory; and (3) Interpolation on a DCT block basis results in the loss of valid reproduced data within DCT blocks containing errors, so that there is a mismatch between pictures reproduced from a dubbed tape with corresponding pictures reproduced from a master tape since, upon reproduction, it is possible to produce pictures based on valid data (such as AC components having frequencies lower than components represented by erroneous data), as well as based on data produced through interpolation.

However, if in carrying out a dubbing operation, only valid data is framed (formed into sync blocks having a fixed-length word format) without carrying out interpolation, only some of the data in DCT blocks in which errors have occurred are valid, so that framing such blocks renders the separation therebetween indistinct upon reproduction, resulting in incorrect decoding. If an EOB code is forcibly attached or added for the purpose of enabling separation between blocks, error information is thereby lost so that interpolation for error compensation cannot be carried out at reproduction.

To overcome these problems, the error processor 17 of the present embodiment replaces erroneous DC and AC values with a predetermined code when dubbing is carried out to enable error interpolation upon reproduction of the dubbed tape. More specifically, the error processor 17 implements the functions described below.

Figure 3:
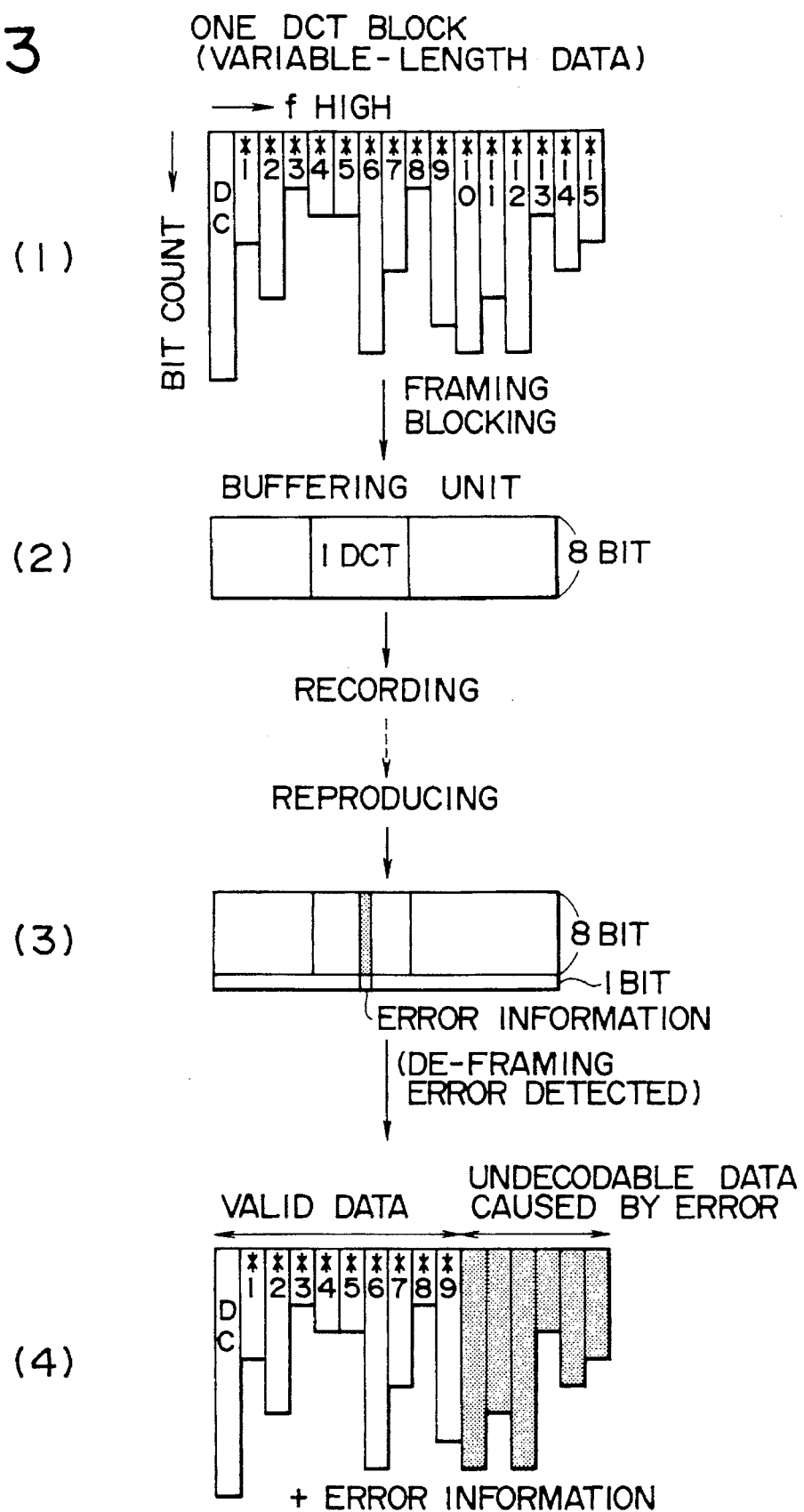
FIG. 3 is a diagram for use in illustrating the operations of framing and de-framing circuits included in the recording system and a reproducing system, respectively, of the digital VTR of FIG. 1.
Figure 4:
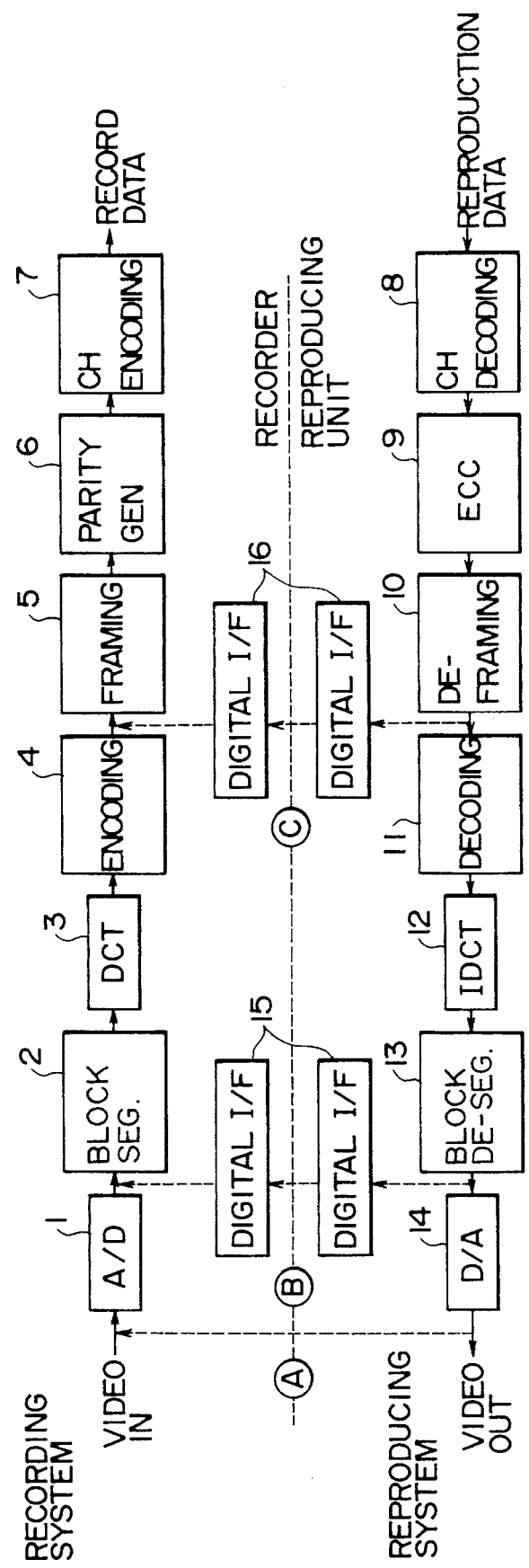
FIG. 4 is a block diagram for use in illustrating possible dubbing methods which may be employed using the digital VTR of FIG. 1.
Figure 6:
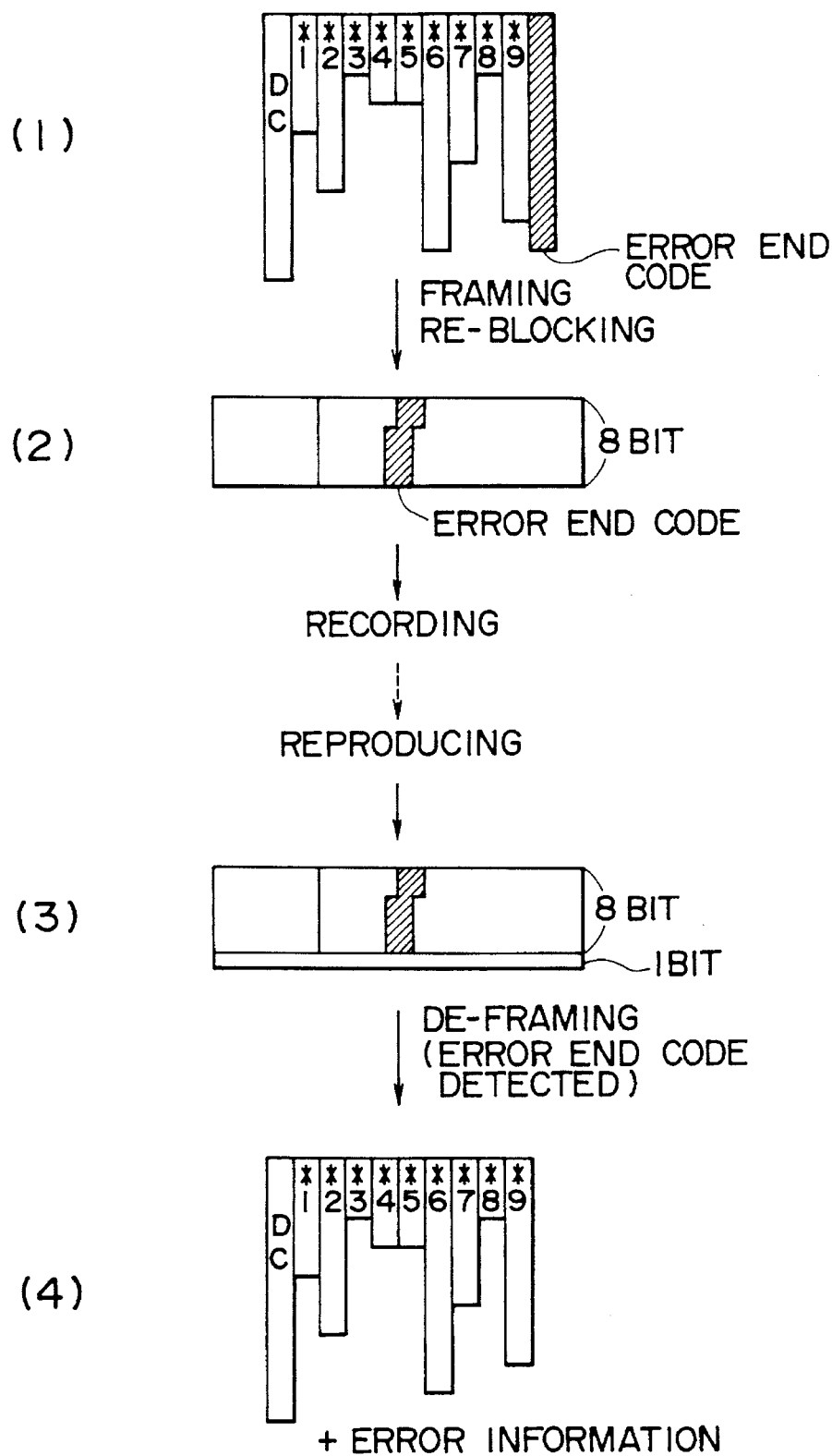
FIG. 6 is a diagram for use in illustrating one technique for including error codes in digital data to be dubbed in accordance with the embodiment of FIG. 5.

(1) When errors occur in AC values:

A special error end code is included in a variable-length code table (which may be stored, for example, in an appropriate memory). With reference again to FIG. 3, as discussed above, in this example an error has occurred in AC component *10. With reference also to (1) of FIG. 6, in the present embodiment the dubbing error processor 17 replaces component *10 with the error end code. When the block is re-packed in fixed-length format, as shown at (2) of FIG. 6, and subsequently reproduced as shown at (3) of FIG. 6, the error end code may be detected in order to enable reproduction of all remaining valid components as shown at (4) of FIG. 6, while preserving the error information. More specifically, upon reproduction the error end code is detected by the de-framing circuit 10*a* of the reproducing unit 100 so that the output of the de-framing circuit 10*a* possesses the same information as data reproduced from the master tape, and no change (or degradation) in image quality results from dubbing. Systematically, error processing requires the addition of only one word to the variable-length code table, without requiring any further modifications thereto, special processing not being required. The error end code may be selected to have an appropriate length so that data compression efficiency will not be affected.

Desirably, the error end code is selected as a code word not otherwise used for encoding data, so that the length of the code word normally will be relatively long. However, the use of a relatively long error end code can result in an increase in the data amount, which can cause an overflow error. To avoid this problem, the EOB code itself preferably is used as the error end code, so that replacing erroneous data by the error end code will not cause an overflow error. An appropriate implementation of such an EOB code is now described with reference to FIG. 7A.

FIG. 7A illustrates an example of a two-dimensional variable-length code table which may be used in the present embodiment. The exemplary entry (A, B) provided in FIG. 7A indicates that the run length of the entry is zero, while the absolute value of the quantized DCT coefficient represented thereby is B. As shown in the table of FIG. 7A, the EOB error end code is assigned a bit pattern (11110) which is a synchronization code so that, even when an error has occurred, the presence of this bit pattern enables identification of the separation between the variable-length codes to permit decoding again after dubbing.

It will be seen from FIG. 7A that each of the codes other than the EOB code has a sign bit S for indicating whether the corresponding DCT coefficient value is positive or negative. To maintain this regulation, a special bit R is appended to the EOB code, so that the EOB code pattern has the form (11110R). The appended bit R serves to indicate whether the EOB code represents a normal end of block (in which case R=0), or whether the code is used as an error end code (in which case R=1).

Figure 7B:
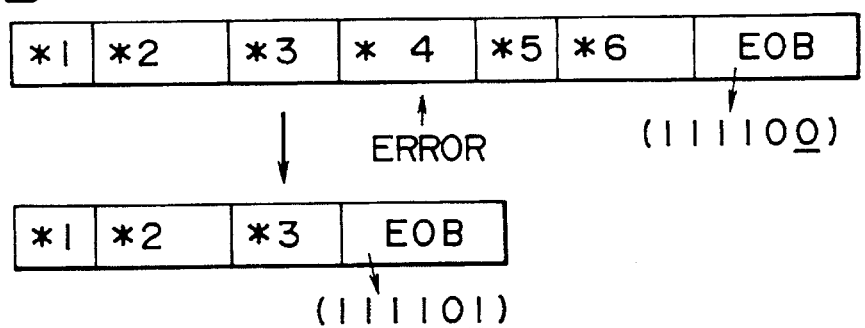
FIG. 7B illustrates a technique for replacing erroneous AC components by the end-of-block code included in the table of FIG. 7A.

With reference also to FIG. 7B, the AC components of an exemplary DCT block is illustrated therein where component *4 thereof contains an error. In accordance with the present embodiment, the erroneous data of component *4 is replaced by the EOB code having R=1 to indicate that the code has replaced erroneous data. It will also be seen from FIG. 7B that higher frequency components, namely, *5 and *6, as well as the normal EOB code have also been replaced by the EOB error end code. It will be seen that only the last bit of the EOB code need be checked to determine whether the block contains an error. It will also be appreciated that, although the pattern (11110) has been used as the EOB code in the example of FIGS. 3A and 3B, other patterns may be used therefor.

Figure 8:
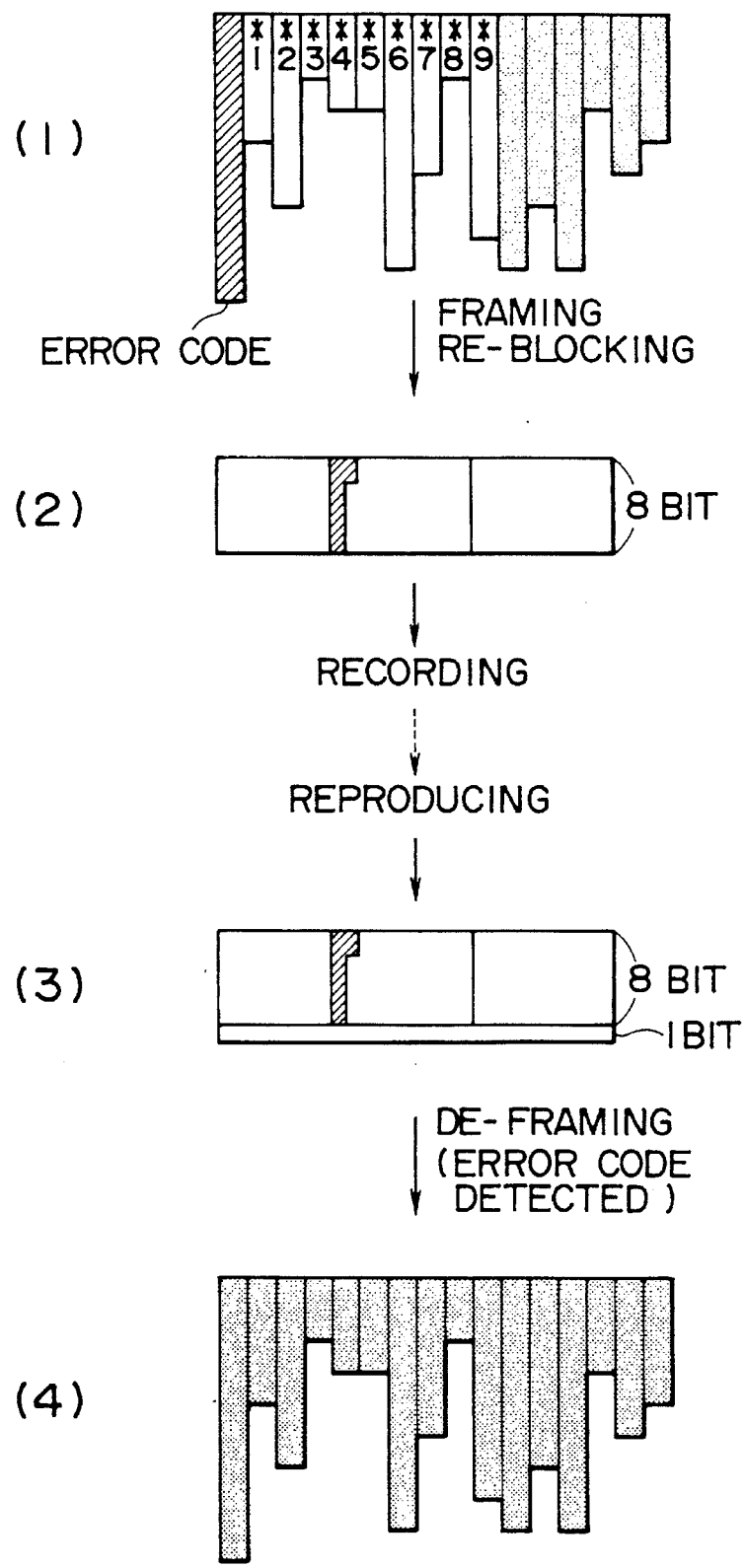
FIG. 8 is a diagram for illustrating a further technique for processing an AC component error for use in the embodiment of FIG. 5.

In the alternative, where an error has occurred in a AC component of a DCT block, the DC component of the block may be replaced as illustrated in (1), (2) and (3) of FIG. 8. For example, the DC component may be replaced with a predetermined 9-bit bit error code such as 100000000 or 011111111. In this variation, when the 9-bit error code is detected during reproduction of a dubbed tape which has been processed in this manner, all of the data in the DCT block containing the error is rendered invalid, as indicated at (4) in FIG. 8, and replaced by interpolation in the block desegmentation circuit 13 or 13*a*.

Figure 9:
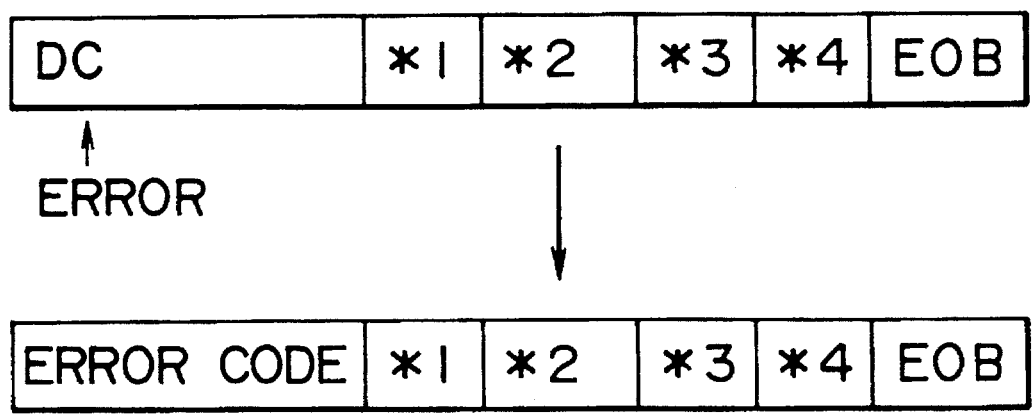
FIG. 9 is a diagram for illustrating replacement of a DC component of a DCT block by an error code for use in the embodiment of FIG. 5.

(2) When the DC component of a DCT block contains an error:

When errors occur in the DC value of a DCT block, the erroneous data may be replaced with a 9-bit code not otherwise used for representing DCT component data, such as 100000000 or 011111111, for example, by the dubbing error processor 17. An exemplary DCT block in which an error has occurred in the DC component is illustrated in FIG. 9, so that the same is replaced by an appropriate code in the processor 17. This technique permits recording of an error code without requiring inclusion of a special code in a variable-length code table which would increase information redundancy. It should be noted that the AC components of the block may still be separated as valid data despite the error in the DC component.

Second Embodiment

Figure 10:
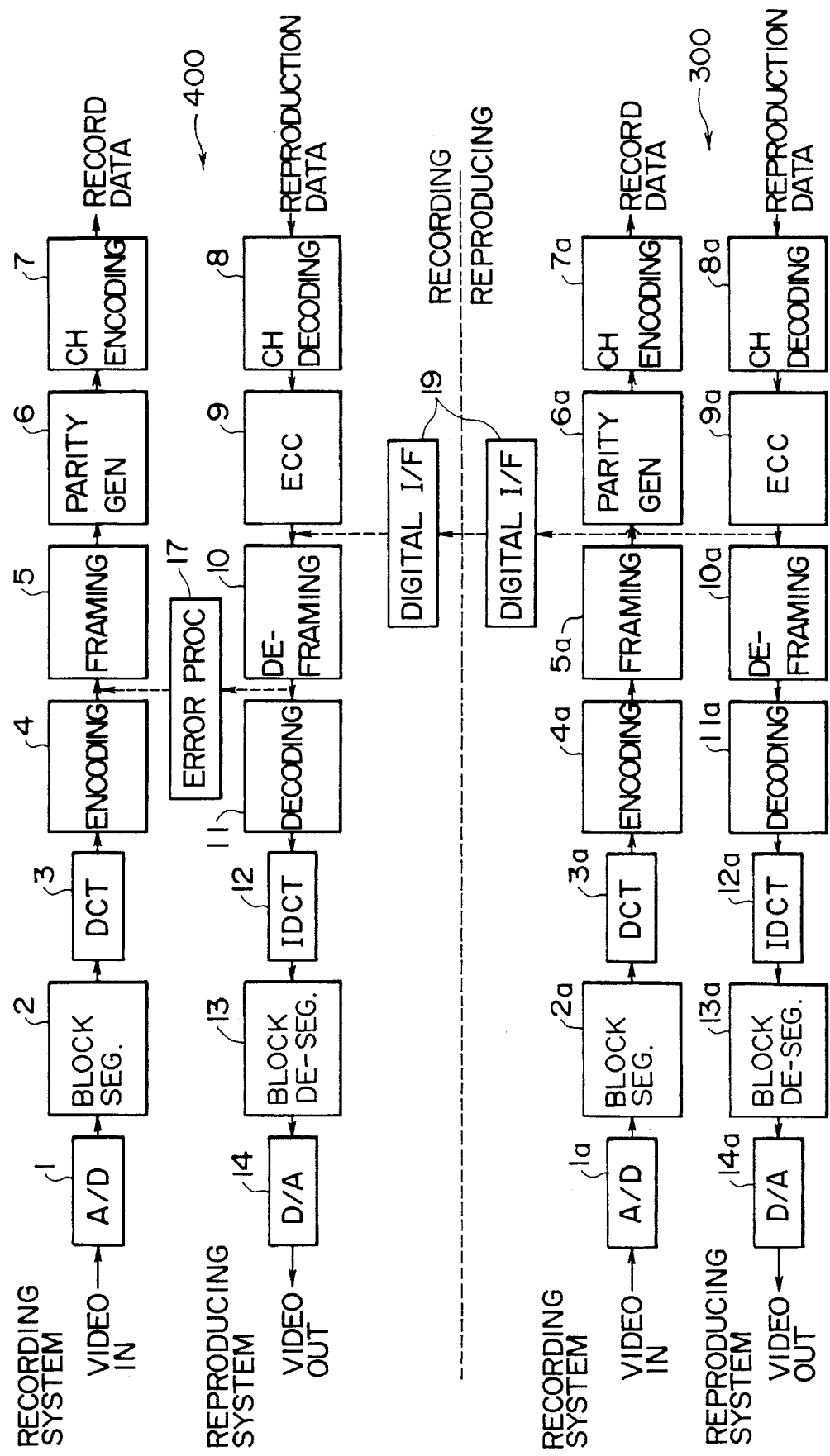
FIG. 10 is a block diagram illustrating a system and method in accordance with a second embodiment of the present invention.

Referring now to FIG. 10, a second embodiment of a system for dubbing a digital video signal on a record medium in accordance with the present invention is illustration in block format therein. In the system of FIG. 10, a reproducing unit 300 includes circuits 1*a* through 14*a* corresponding with elements 1*a* through 14*a* of the reproducing unit 100 of the FIG. 5 embodiment. The system of FIG. 10 also includes a recording unit 400 including elements 1 through 14 corresponding with the like-numbered elements of the recording unit 200 of FIG. 5. In the embodiment of FIG. 10, the output of the ECC circuit 9*a* is coupled both with the input of the de-framing circuit 10*a* to provide a normal reproducing output, and is also coupled with an input of a digital I/F 19 to be supplied to the input of de-framing circuit 10 of the recording unit 400. When the reproducing unit 300 is employed to carry out a dubbing operation, circuits 1*a* through 7*a* are maintained in an inoperative state.

The output of the de-framing circuit 10 of the unit 400 is supplied both to the input of a dubbing error processor 17 (corresponding with the like-numbered circuit of FIG. 5) and also to the input of the decoder 11 to provide a video signal for monitoring. After error processing by the processor 17, the data is supplied to the input of the framing circuit 5 to be rearranged as fixed-length words in a sync block format and then supplied to the parity generator 6 to be provided with a new parity and then output therefrom to the channel encoder 7 to be encoded for recording on a record medium. During the dubbing operation, circuits 1 through 4, 8 and 9 of the recording unit 400 are maintained in an inoperative state.

It will be seen that, in contrast to the embodiment of FIG. 5 wherein dubbing error processing is carried out in the reproducing unit 100, in the embodiment of FIG. 10, such processing takes place in the recording unit 400. This eliminates the need for the framing circuit 5*a* of the reproducing unit 300 when carrying out the dubbing operation, as well as the need for a dubbing error processor in the reproducing unit 300. Accordingly, the embodiment of FIG. 10 may be employed where the signal to be dubbed is reproduced by a unit having only a reproduction capability or by a device such as a camcorder which does not have a digital input. Consequently, the embodiment of FIG. 10 may be implemented with the use of relatively less complex equipment than that of FIG. 5. However, the embodiment of FIG. 10 requires the transmission of error information (such as a flag or the like) supplied by the ECC circuit 9a from the reproducing unit 300 to the recording unit 400, thereby increasing the data transfer rate by approximately 10 percent where, for example, a one-bit flag is included with each 8-bit data sample.

With suitable modification, the parity generator 6, channel encoder 7, channel decoder 8 and ECC circuit 9 may be employed as a tape recorder for recording a digital signal supplied by an external processor to the digital I/F 19, for example, to record and/or reproduce data having a format such as DAT, Advanced TV (ATV) or computer data. It will be appreciated that when the system is operated in this manner, it is unnecessary to carry out de-framing, dubbing error processing and framing as described hereinabove, since in the recording mode, data would flow from the digital I/F 19 to the parity generator 6, while upon reproduction, data flows from the ECC circuit 9 to the digital I/F 19.

Third Embodiment

With reference now to FIG. 11, a third embodiment of a system for dubbing a digital video signal on a record medium is illustrated therein which is capable of implementing the dubbing techniques as explained above in connection with the first and second embodiments, and is illustrated in the form of a digital VTR 500. Circuits 1 through 14 and 17 of the VTR 500 correspond with the like-numbered elements of the recording unit 400 of the FIG. 10 embodiment. VTR 500 also includes a switching circuit 21 having first and second selectable inputs, the first input thereof being coupled with the output of the encoding circuit 4 and the second input thereof being coupled with the output of the error processor 17. The switching circuit 21 has an output coupled with the input of the framing circuit 5 and is operative to selectably couple the first or second input terminal thereof to its output, thus to supply either the output of the encoding circuit 4 or that of the error processor 17 to the input of the framing circuit 5. The VTR 500 also includes a bidirectional digital I/F 20 coupled with the output of the framing circuit 5 and the input of parity generator 6 by means of a bus 22 and with the output of the ECC circuit 9 and the input of the de-framing circuit 10 via a bus 23.

(a) Reproduction mode corresponding with that of the FIG. 5 embodiment: The digital VTR 500 provides the same capability as the reproducing unit 100 of the FIG. 5 embodiment in a first mode of operation. In accordance with the first mode, a reproduced video output is obtained over a signal path from the channel decoder 8 to the D/A converter 14. Moreover, when the switching circuit 21 is set to convey the output of the error processor 17 to the input of the framing circuit 5, error-corrected data is provided from the output of the framing circuit 5 via the bus 22 through the digital I/F 20 to a bus 510 for output in the form of recording signals from the VTR 500.

(B) Reproduction mode corresponding with the second embodiment: In this second mode, data with error information attached is supplied by the ECC circuit 9 via the bus 23 to the digital I/F 20 for supply via the bus 510 to an external processor 24, which may be, for example, an editing machine, personal computer or ATV processor.

Figure 1:
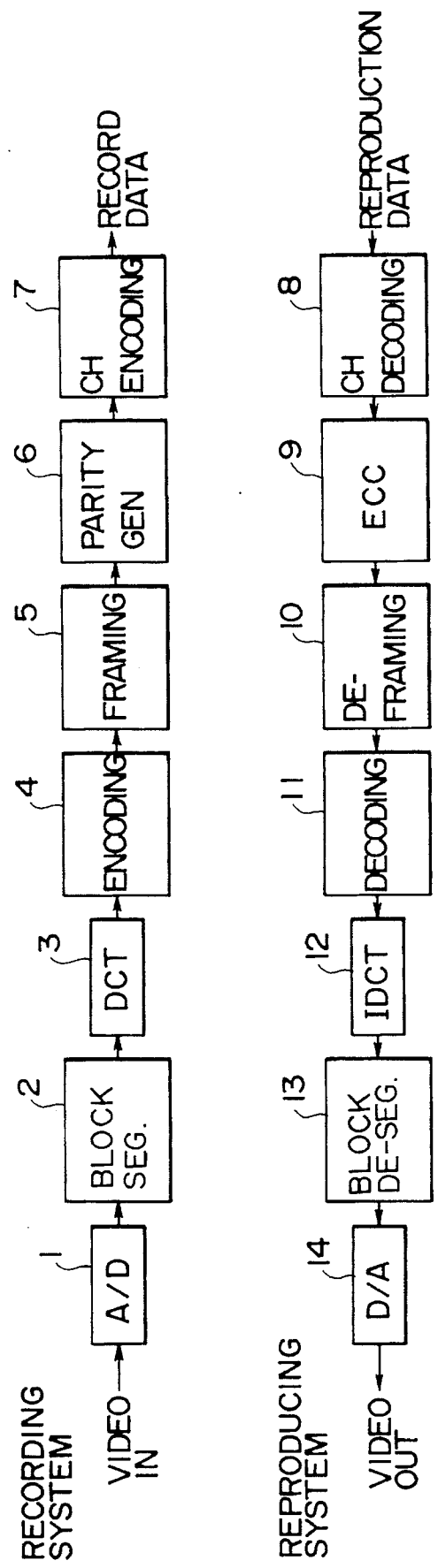
FIG. 1 is a block diagram of a digital VTR for consumer use in which DCT and variable-length coding are employed.
Figure 2:
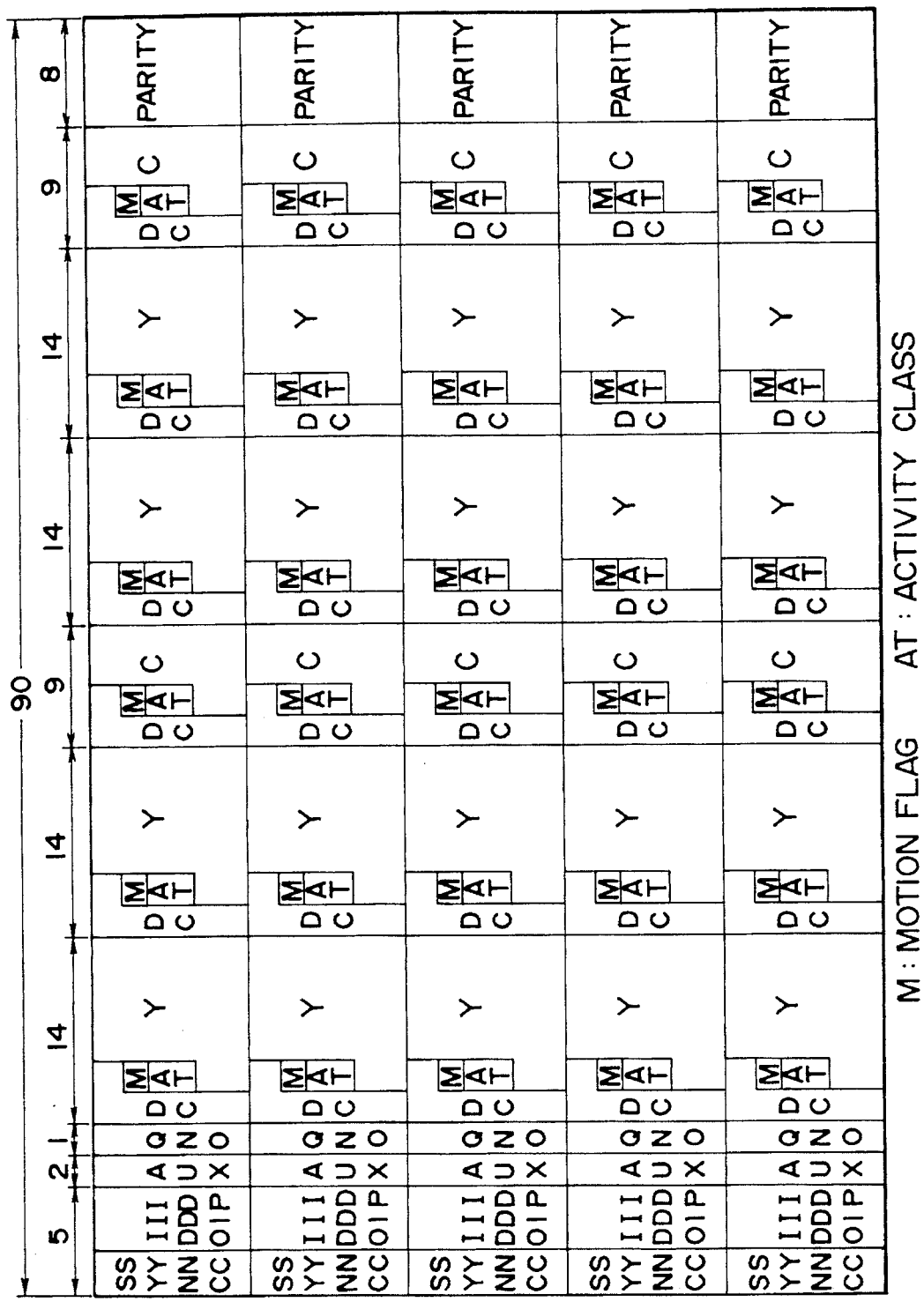
FIG. 2 illustrates a sync block format for encoding a buffering unit in a recording system of the digital VTR of FIG. 1.

In carrying out a dubbing operation with the use of the digital VTR 500, either the first or second mode may be selected depending on the capabilities of a mated VTR coupled with the output 510 for use in recording the dubbed video signal. In the alternative, the first mode of operation may be employed for use independently of another VTR. In a modification to the VTR 500, the apparatus responds to identification data included with recorded data (such as ID0 and ID1 as illustrated in FIG. 2) for automatically switching the digital I/F 20 to output the data to the external processor 24.

(C) Recording mode corresponding with the first embodiment: in this third mode of operation, the digital I/F 20 receives data via the bus 510 and supplies the same via the bus 22 to the parity generator 6, and therefrom to the channel encoder for recording. The data is also supplied by the digital I/F 20 via the bus 23 to the input of the de-framing circuit 10 to provide a video output for monitoring purposes. The data may be supplied, for example, either by the mated VTR or external processor 24.

(D) Recording mode corresponding with the second embodiment: in this fourth mode, data is supplied by the bus 23 from the digital I/F 20 to the input of the de-framing circuit 10, and therefrom to both the error processor 17 and the decoding circuit 11 (to provide a video output for monitoring). The switching circuit 21 is set to supply the output from the error processor to the input of the framing circuit 5 for recording via the parity generator 6 and channel encoder 7. It will be seen that in this mode of operation, data is not supplied via the bus 22.

Selection of either the third or fourth modes of operation described above is carried out either by manual switching or, by means of the identification data described above, automatically.

It will be appreciated that the digital VTR 500 of FIG. 11, when operating in the second (reproducing) or third (recording) modes may be employed as a reproduction-only unit, a camcorder or an ordinary VTR. For example, in one possible system configuration, such a reproduction-only unit providing an output in accordance with the second mode described above may be employed with a camcorder capable of operating in the fourth mode. As a further example, dubbing may be carried out with the use of a unit providing the second and third modes of operation in combination with the VTR 500.

In the second embodiment as illustrated in FIG. 10, the need to attach error information to the data transmitted via the digital I/F 19 limits the transfer rate. Consequently, in carrying out dubbing between digital VTR's in accordance with the third embodiment of FIG. 11, dubbing error processing advantageously is carried out by the reproducing unit so that it is unnecessary to transfer error information from the reproducing unit to the recording unit. It will be appreciated that additional information may thus be transmitted in place of the then unnecessary error information, so that additional functional capabilities may be implemented.

While the error processing described above is concerned principally with errors encountered during recording and/or reproducing processes, following is a description of error processing techniques for errors arising within a signal path (for example, a digital I/F) over which data is transmitted from a reproducing unit to a recording unit for the purpose of dubbing. In order to enable such error processing, data may be transmitted from the reproducing unit to the recording unit with a check code such as a cyclic redundancy check (CRC) code attached and, upon reception by the recording unit, the data is checked for errors and error correction is carried out, if required. If a simple check code is used permitting data to be checked on a SYNC block basis, one of the following countermeasures may be employed when uncorrectable errors occur:

(1) All DC values in the SYNC block in which the error has occurred are replaced by an error code, for example, the error code illustrated in FIG. 9; or (2) All of the data in the SYNC block in which the error has occurred may be set to zero or one.

If a SYNC block whose contents has thus been replaced by an error code is detected upon reproduction of a copied tape, all of the data in the SYNC block are regarded as invalid and replaced by data produced through interpolation by the de-blocking circuit 13 of one of the above embodiments.

Various modifications to the above embodiments are contemplated. For example, DC components containing errors may be replaced by the 9-bit error code illustrated in FIG. 9 even in data in SYNC block format. In addition, the present invention is also applicable for use with apparatus such as digital VTR's employing different coding schemes such as a Hadmard transform and K-L expansion.

It will be appreciated, therefore, that the present invention provides the following advantages over other dubbing systems and methods. For example, the present invention permits compressed data to be transmitted from a reproducing unit to a recording unit, thus providing an advantageously low data transfer rate. The present invention also provides advantageously high image quality with relatively low data redundancy as compared with techniques in which digital component video signals are transmitted. Tapes copied in accordance with the present invention provide reproduced images with virtually the same image quality as those provided by a master tape. Moreover, the use of the EOB error end code affords the ability to avoid increasing the data amount even when code replacement is carried out for erroneous data, thus to avoid overflow errors.

Although specific embodiments of the invention have been described in detail herein with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for dubbing a digital video signal on a record medium, the digital video signal being encoded to include a plurality of variable-length codes arranged in first data blocks in a fixed-length word format, comprising the steps of:

separating the plurality of variable-length codes from the first data blocks to provide separated variable-length codes;

providing error codes indicating errors in the separated variable-length codes;

including the separated variable-length codes together with the error codes in second data blocks having a fixed-length word format; and recording the second data blocks on the record medium.

2. The method of claim 1, wherein the step of separating the plurality of variable-length codes is carried out by a video signal reproducing unit, and the step of recording the second data blocks is carried out by a recording unit separate from the reproducing unit.

3. The method of claim 2, wherein the steps of providing the error codes and including the separated codes in second data blocks are carried out by the reproducing unit.

4. The method of claim 3, further comprising the step of transmitting the second data blocks from the reproducing unit to the recording unit via a digital interface.

5. The method of claim 2, wherein the step of including the separated codes in second data blocks is carried out in the recording unit.

6. The method of claim 1, wherein the steps of separating the variable-length codes, providing the error codes, forming the separated codes into second data blocks and recording the second data blocks are carried out by a recording unit.

7. The method of claim 6, further comprising the step of transmitting the digital video signal from a reproducing unit to the recording unit via a digital interface.

8. The method of claim 1, wherein the step of providing error codes comprises replacing erroneous variable-length codes with the error codes.

9. The method of claim 8, wherein the step of replacing erroneous variable-length codes comprises replacing erroneous variable-length codes representing AC components of discrete cosine transformed data with error codes defined in a variable-length code table.

10. The method of claim 9, wherein the step of replacing the erroneous variable-length codes comprises replacing a variable-length code with an end-of-block code.

11. The method of claim 10, wherein the end-of-block code is provided with an identification signal for indicating whether the end-of-block code is an error code.

12. A system for dubbing a digital video signal on a record medium, the digital video signal being encoded to include a plurality of variable-length codes arranged in first data blocks in a fixed-length word format, comprising:

means for separating the plurality of variable-length codes from the first data blocks to provide separated variable-length codes;

means for providing error codes indicating errors in the separated variable-length codes;

block forming means for including the separated variable-length codes together with the error codes in second data blocks having a fixed-length word format; and means for recording the second data blocks on the recording medium.

13. The system of claim 12, wherein the means for separating the variable-length codes is included in a reproducing unit capable of reproducing said digital video signal.

14. The system of claim 13, wherein the means for providing error codes and the block forming means are included in the reproducing unit.

15. The system of claim 14, wherein the means for recording is included in a recording unit separate from the receiving unit, and further comprising digital interface means for transmitting the second data blocks from the reproducing unit to the recording unit.

16. The system of claim 13, wherein the block forming means and the means for recording are included in a recording unit separate from the reproducing unit.

17. The system of claim 12, wherein the separating means, the means for providing the error codes, the block forming means and the recording means are included in a recording unit.

18. The system of claim 17, further comprising a reproducing unit separate from the recording unit and including means for reproducing the first data blocks from a further recording medium, the system also comprising digital interface means for transmitting the first data blocks from the reproducing unit to the recording unit.

19. The system of claim 12, wherein the means for providing error codes is operative to replace erroneous variable-length codes with the error codes.

20. The system of claim 19, wherein the means for providing error codes is operative to replace erroneous variable-length codes representing AC components of discrete cosine transformed data with error codes defined in a variable-length code table.

21. The system of claim 20, wherein the means for providing error codes is operative to replace an erroneous variable-length code with an end-of-block code.

22. The system of claim 21, wherein the end-of-block code is provided with an identification signal for indicating whether the end-of-block code is an error code.

* * * * *